United States Patent
Fujisaki et al.

(10) Patent No.: US 11,535,173 B2
(45) Date of Patent: Dec. 27, 2022

(54) CAMERA DEVICE

(71) Applicant: KABUSHIKI KAISHA TOKAI-RIKA-DENKI-SEISAKUSHO, Aichi-ken (JP)

(72) Inventors: Suguru Fujisaki, Aichi-ken (JP); Masakazu Iwatsuki, Aichi-ken (JP); Kenichi Mizutani, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/747,653

(22) Filed: Jan. 21, 2020

(65) Prior Publication Data
US 2020/0238922 A1 Jul. 30, 2020

(30) Foreign Application Priority Data

Jan. 25, 2019 (JP) .............................. JP2019-011552

(51) Int. Cl.
| | |
|---|---|
| *B60R 11/04* | (2006.01) |
| *G03B 17/08* | (2021.01) |
| *H04N 5/225* | (2006.01) |
| *G03B 17/24* | (2021.01) |

(52) U.S. Cl.
CPC .............. *B60R 11/04* (2013.01); *G03B 17/08* (2013.01); *H04N 5/2257* (2013.01); *B60K 2370/21* (2019.05); *G03B 17/24* (2013.01)

(58) Field of Classification Search
CPC ....... B60K 2370/21; B60R 1/00; B60R 11/04; G03B 17/08; G03B 17/24; H04N 5/22521; H04N 5/2257; H04N 5/225; H04N 5/2251; H04N 5/2252; G02B 27/0006

USPC .......................................................... 348/148
See application file for complete search history.

(56) References Cited

U.S. PATENT DOCUMENTS

| | | | |
|---|---|---|---|
| 6,377,751 B1* | 4/2002 | Uchiyama | G03B 17/08 396/25 |
| 2005/0162760 A1* | 7/2005 | Fujimori | H04N 9/3141 359/820 |
| 2006/0108352 A1* | 5/2006 | Fernandez | H04N 5/2252 219/522 |
| 2011/0062135 A1* | 3/2011 | Duchayne | H05B 3/84 219/201 |

(Continued)

FOREIGN PATENT DOCUMENTS

| | | |
|---|---|---|
| JP | H03-114467 U | 11/1991 |
| JP | 06-178173 A | 6/1994 |
| JP | 2006-042019 A | 2/2006 |

(Continued)

*Primary Examiner* — Jonathan R Messmore
*Assistant Examiner* — Ana Picon-Feliciano
(74) *Attorney, Agent, or Firm* — Thomas W. Cole; Calderon Safran & Cole P.C.

(57) ABSTRACT

At a camera device for a vehicle, a camera images an obverse side of a glass cover via the glass cover. A water repelling film is formed on an obverse side surface of the glass cover. A transparent conductive film of the glass cover generates heat, and the glass cover is heated. Because the transparent conductive film is electrically conductive, electrical resistance of an obverse side surface of the water repelling film can be lowered by the transparent conductive film, and charging of the obverse side surface of the water repelling film can be suppressed.

9 Claims, 2 Drawing Sheets

(56) References Cited

U.S. PATENT DOCUMENTS

2018/0241861 A1* 8/2018 Kim ..................... H04M 1/026

FOREIGN PATENT DOCUMENTS

| JP | 2010-530830 A | 9/2010 |
|----|---------------|--------|
| JP | 2020-060639 A | 4/2020 |

* cited by examiner

CAMERA DEVICE

CROSS-REFERENCE TO RELATED APPLICATION

This application is based on and claims priority under 35 USC 119 from Japanese Patent Application No. 2019-011552 filed on Jan. 25, 2019, the disclosure of which is incorporated by reference herein.

BACKGROUND

Technical Field

The present invention relates to a camera device in which a camera mechanism images the obverse side of a transmitting member via the transmitting member.

Related Art

In the rear monitoring camera disclosed in Japanese Patent Application Laid-Open (JP-A) No. H6-178173, a CCD substrate images the obverse side of a glass cover via the glass cover. A transparent conductive film is formed at the reverse side of the glass cover. The transparent conductive film generates heat, and the glass cover is heated.

Here, in such a rear monitoring camera, it is desirable to be able to suppress charging of a water repelling film even if the water repelling film forms the obverse side surface of the glass cover.

SUMMARY

In view of the above-described circumstances, an object of the present invention is to provide a camera device that can suppress charging of a water repelling film.

A camera device of a first aspect of the present invention includes: a camera mechanism at which a transmitting member that transmits light is provided, and that images an obverse side of the transmitting member via the transmitting member; a water repelling film that forms an obverse side surface of the transmitting member; and a heat generating film that is provided at the transmitting member further toward a reverse side than the water repelling film, that is electrically conductive, and that generates heat, by which the transmitting member is heated.

In the camera device of the first aspect of the present invention, the camera mechanism images the obverse side of the transmitting member via the transmitting member. The water repelling film forms the obverse side surface of the transmitting member. The heat generating film is provided at the transmitting member further toward the reverse side than the water repelling film. The heat generating film generates heat, by which the transmitting member is heated.

Here, the heat generating film is electrically conductive. Therefore, charging of the water repelling film can be suppressed by the heat generating film.

In a camera device of a second aspect of the present invention, the camera device of the first aspect of the present invention includes a substrate that is provided at the transmitting member, and at whose obverse side the heat generating film is disposed.

In the camera device of the second aspect of the present invention, the heat generating film is disposed further toward the obverse side than the substrate of the transmitting member. Therefore, charging of the water repelling film can be suppressed effectively by the heat generating film.

In a camera device of a third aspect of the present invention, the camera device of the first aspect or the second aspect of the present invention includes an exposure hole that is formed in the water repelling film, and through which the heat generating film is exposed at an obverse side of the transmitting member; and a terminal that is inserted in the exposure hole and is electrically connected to the heat generating film, and that supplies electric power to the heat generating film, by which the heat generating film generates heat.

In the camera device of the third aspect of the present invention, the terminal is electrically connected to the heat generating film, and the terminal supplies electric power to the heat generating film, and the heat generating film generates heat.

Here, the heat generating film is exposed at the obverse side of the transmitting member via the exposure hole of the water repelling film. The terminal is inserted in the exposure hole, and is electrically connected to the heat generating film. Therefore, the terminal can easily be electrically connected to the heat generating film.

BRIEF DESCRIPTION OF THE DRAWINGS

Exemplary embodiments of the present invention will be described in detail based on the following figures, wherein.

DETAILED DESCRIPTION

Figure 1:
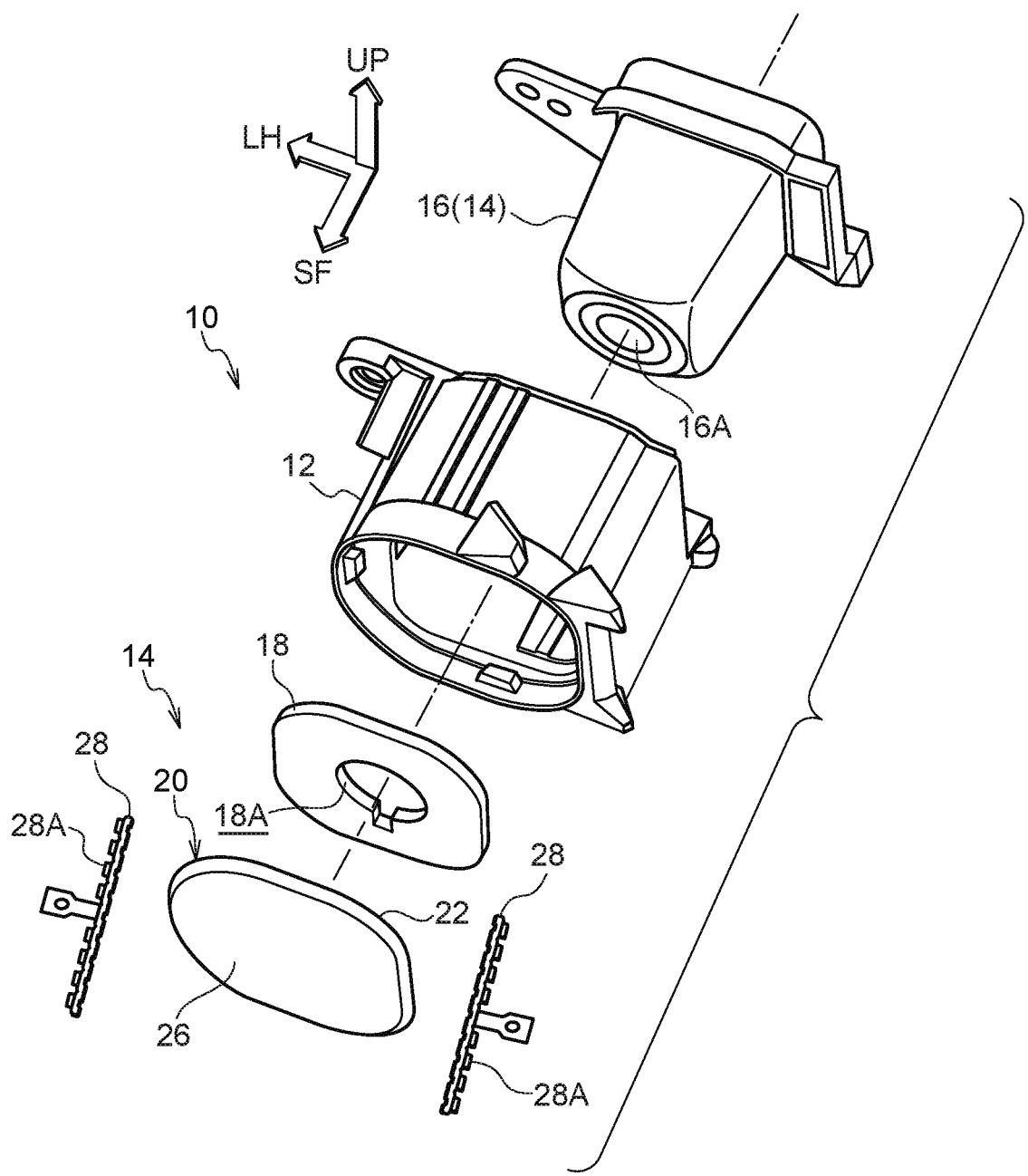
FIG. 1 is a perspective view showing a camera device for a vehicle relating to an embodiment of the present invention.

A camera device 10 for a vehicle, which serves as a camera device relating to an embodiment of the present invention, is shown in FIG. 1 in a perspective view. Note that, in the drawings, the obverse side of the camera device 10 for a vehicle is indicated by arrow SF, the left side of the camera device 10 for a vehicle is indicated by arrow LH, and the upper side of the camera device 10 for a vehicle is indicated by arrow UP.

The camera device 10 for a vehicle relating to the present embodiment is set at the vehicle outer side of the vehicle front side end of a vertical direction intermediate portion of a side door (in particular, a front side door) of a vehicle. For example, the obverse side, the left side and the upper side of the camera device 10 for a vehicle coincide with the rear side, the left side and the upper side of the vehicle, respectively.

As shown in FIG. 1, a bracket 12 that is substantially shaped as a rectangular tube is provided at the camera device 10 for a vehicle. The bracket 12 is connected to the side door, and is disposed such that the axial direction thereof is parallel to the obverse-reverse direction thereof.

A camera mechanism 14 is provided within the bracket 12.

A camera 16 that is substantially rectangular parallelepiped is provided at the camera mechanism 14. The camera 16 is accommodated within the bracket 12 and is fixed to the bracket 12. A lens 16A is provided at the center of the obverse side end portion of the camera 16. The lens 16A is exposed at the obverse side.

Double-sided tape 18 that is substantially shaped as a rectangular plate is disposed at the obverse side of the camera 16. The double-sided tape 18 is accommodated within the bracket 12, and the reverse side surface thereof is adhered to the obverse side surface of the camera 16. A through-hole 18A that is substantially circular is formed so as to pass-through the center of the double-sided tape 18. The through-hole 18A is disposed coaxially with the lens 16A, and exposes the lens 16A at the obverse side of the double-sided tape 18.

Figure 2:
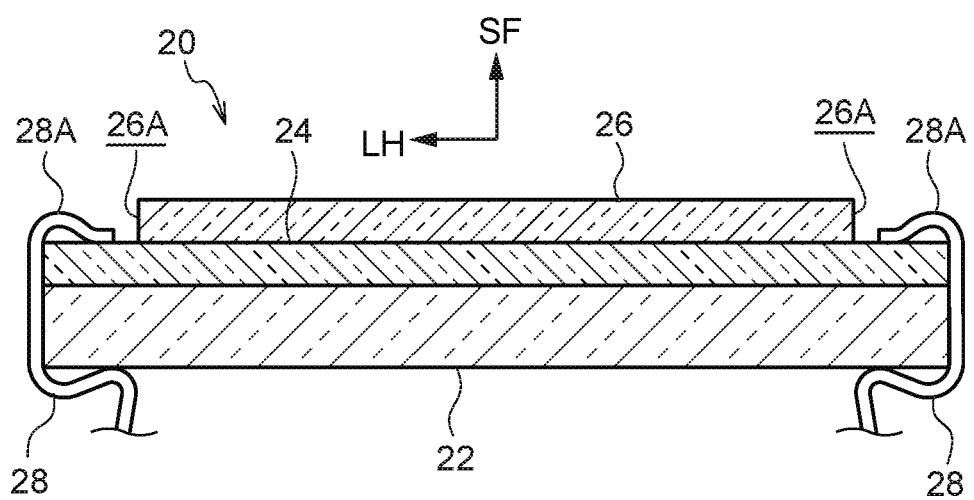
FIG. 2 is a cross-sectional view showing a glass cover of the camera device for a vehicle relating to the embodiment of the present invention.

A glass cover 20 (see FIG. 2) that is substantially shaped as a rectangular plate is disposed at the obverse side of the double-sided tape 18. The glass cover 20 is accommodated within the obverse side end portion of the bracket 12. The reverse side surface of the glass cover 20 is adhered to the obverse side surface of the double-sided tape 18.

A glass 22, which is substantially shaped as a rectangular plate and serves as a substrate, is provided at the glass cover 20. The glass 22 forms the reverse side surface of the glass cover 20 and is transparent, and transmits light therethrough.

A transparent conductive film 24 that serves as a heat generating film is formed on the entire obverse side surface of the glass 22. The material of the transparent conductive film 24 is, for example, ITO (Indium Tin Oxide). The transparent conductive film 24 is transparent, and transmits light therethrough. The transparent conductive film 24 is electrically conductive. Electric power is supplied to the transparent conductive film 24, and the transparent conductive film 24 generates heat.

A water repelling film 26 is formed on substantially the entire obverse side surface of the transparent conductive film 24. The water repelling film 26 forms the obverse side surface of the glass cover 20. The portion of the water repelling film 26, other than the outer peripheral portion of the obverse side surface thereof, is exposed to the vehicle exterior. The water repelling film 26 has the ability to repel water. The so-called contact angle at the water repelling film 26 (the angle of the border portion of the outer peripheral surface of water with the water repelling film 26 with respect to the bottom surface of the water at the time when the water is on the water repelling film 26) is, for example, greater than or equal to 90° (preferably greater than or equal to 100°). The water repelling film 26 is an insulator and has high electrical resistance, and is transparent and transmits light therethrough.

Exposure holes 26A are formed so as to pass-through at the outer peripheral portions at the left side and the right side of the water repelling film 26. The exposure holes 26A expose the transparent conductive film 24 to the obverse side. The exposure holes 26A extend along the outer peripheral of the water repelling film 26, and are open to the radial direction outer side of the water repelling film 26.

Terminals 28 (see FIG. 2), which are respectively made of metal and shaped as elongated plates, are mounted to the outer peripheral portions at the left side and the right side of the glass cover 20. The length directions of the terminals 28 are bent along the outer peripheral portion of the glass cover 20. Plural connecting portions 28A are formed at the terminals 28. The plural connecting portions 28A respectively project-out toward the width direction both sides of the terminals 28, and are disposed at uniform intervals along the length directions of the terminals 28. Each of the connecting portions 28A is bent in a U-shape in cross-section. The connecting portions 28A nip the glass 22 and the transparent conductive film 24 of the glass cover 20 in a state of being inserted in the exposure holes 26A of the water repelling film 24. Due thereto, the terminals 28 are, at the respective connecting portions 28A thereof, electrically connected to the transparent conductive film 24.

Operation of the present embodiment is described next.

In the camera device 10 for a vehicle of the above-described structure, at the camera mechanism 14, light is incident onto the lens 16A of the camera 16 from the obverse side of the glass cover 20 via the glass cover 20 and the through-hole 18A of the double-sided tape 18, and the camera 16 images the obverse side of the glass cover 20 via the glass cover 20.

Further, the water repelling film 26 forms the obverse side surface of the glass cover 20, and adhering of water droplets onto the obverse side surface of the glass cover 20 is suppressed by the water repelling film 26. Therefore, the imaging by the camera 16 being impeded by water droplets is suppressed.

Moreover, due to electric power being supplied by the pair of terminals 28 to the transparent conductive film 24 of the glass cover 20, the transparent conductive film 24 generates heat, and the glass cover 20 is heated. Therefore, fog and frost that have adhered to the obverse side surface of the glass cover 20 are removed, and due thereto, imaging by the camera 16 being impeded by fog and frost is suppressed.

By the way, the obverse side surface of the water repelling film 26 (the obverse side surface of the glass cover 20) is formed by an insulator. Therefore, the obverse side surface of the water repelling film 26 becomes charged due to the friction with the air at the time when the vehicle travels for example, and it is easy for the obverse side surface of the water repelling film 26 to adsorb dust and the like that is within the air. Further, when the obverse side surface of the water repelling film 26 adsorbs dust or the like that is within the air, the water repelling performance of the obverse side surface of the water repelling film 26 deteriorates.

Here, the transparent conductive film 24 is electrically conductive. Therefore, the electrical resistance of the obverse side surface of the water repelling film 26 can be lowered by the transparent conductive film 24, and charging of the obverse side surface of the water repelling film 26 can be suppressed by the transparent conductive film 24. Due thereto, a deterioration in the water repelling performance of the obverse side surface of the water repelling film 26, due to the obverse side surface of the water repelling film 26 adsorbing dust or the like that is within the air, can be suppressed, and the obverse side surface of the water repelling film 26 can continuously exhibit a water repelling performance.

Moreover, at the glass cover 20, the transparent conductive film 24 is disposed further toward the obverse side (the water repelling film 26 side) than the glass 22. Therefore, the electrical resistance of the obverse side surface of the water repelling film 26 can be lowered effectively by the transparent conductive film 24, and charging of the obverse side surface of the water repelling film 26 can be effectively suppressed by the transparent conductive film 24.

Furthermore, the transparent conductive film 24 contacts the reverse side surface of the water repelling film 26. Therefore, the electrical resistance of the obverse side surface of the water repelling film 26 can be lowered more effectively by the transparent conductive film 24, and charging of the obverse side surface of the water repelling film 26 can be suppressed more effectively by the transparent conductive film 24.

Further, the transparent conductive film 24 is transparent, and is disposed over the entire imaging range of the camera 16 at the glass cover 20 (the range of transmittance of the light incident on the lens 16A). Therefore, the transparent conductive film 24 impeding imaging by the camera 16 can be suppressed. Furthermore, differently than in a case in which the transparent conductive film 24 is disposed only outside of the imaging range of the camera 16 at the glass cover 20, the transparent conductive film 24 can directly heat the entire imaging range of the camera 16 at the glass cover 20, and can remove fog and frost from the entire imaging range of the camera 16 at the glass cover 20 at an early stage.

Moreover, at the glass cover 20, the transparent conductive film 24 is disposed further toward the obverse side (the water repelling film 26 side) than the glass 22. Therefore, the transparent conductive film 24 can effectively heat the water repelling film 26, and fog and frost can be removed effectively from the obverse side surface of the glass cover 20 (the obverse side surface of the water repelling film 26).

Furthermore, the transparent conductive film 24 contacts the reverse side surface of the water repelling film 26. Therefore, the transparent conductive film 24 can more effectively heat the water repelling film 26, and can more effectively remove fog and frost from the obverse side surface of the glass cover 20 (the obverse side surface of the water repelling film 26).

Further, the connecting portions 28A of the terminals 28 are inserted in the exposure holes 26A of the water repelling film 26, and are electrically connected to the transparent conductive film 24. Therefore, the terminals 28 can easily be electrically connected to the transparent conductive film 24.

Note that, in the present embodiment, the transparent conductive film 24 contacts the reverse side surface of the water repelling film 26. However, an intermediate film may be provided between the water repelling film 26 and the transparent conductive film 24.

Moreover, in the present embodiment, the transmitting member is made to be the glass cover 20. However, for example, in a case in which the lens 16A of the camera 16 is exposed to the vehicle exterior, the transmitting member may be made to be the lens 16A.

Further, in the present embodiment, the camera device 10 for a vehicle is disposed at a side door of a vehicle. However, the camera device 10 for a vehicle may be set at a portion of a vehicle other than a side door.

Moreover, in the present embodiment, the camera device is made to be the camera device 10 for a vehicle. However, the camera device may be made to be a device that is other than the camera device 10 for a vehicle.

What is claimed is:

1. A camera device comprising:
a camera mechanism at which a transmitting member that transmits light is provided, and that images an obverse side of the transmitting member via the transmitting member;
a water repelling film that forms an obverse side surface of the transmitting member;
a heat generating film that is provided at the transmitting member further toward a reverse side than the water repelling film, that transmits light, that is electrically conductive, and that generates heat, by which the transmitting member is heated, and
a substrate that is provided at the transmitting member, and at whose obverse side the heat generating film is disposed in direct contact,
wherein the obverse side faces away from the camera mechanism, such that the heat generating film is sandwiched between the water repelling film and the substrate.

2. The camera device of claim 1, comprising:
an exposure hole that is formed in the water repelling film, and through which the heat generating film is exposed at an obverse side of the transmitting member; and
a terminal that is inserted in the exposure hole and is electrically connected to the heat generating film, and that supplies electric power to the heat generating film, by which the heat generating film generates heat.

3. The camera device of claim 2, wherein the exposure hole opens at an outer side of an outer periphery of the transmitting member.

4. The camera device of claim 3, wherein the terminal nips the transmitting member therebetween.

5. The camera device of claim 1, wherein the water repelling film contacts the heat generating film.

6. The camera device of claim 1, wherein the heat generating film is disposed at an entire imaging range of the camera mechanism.

7. The camera device of claim 1, wherein the obverse side faces away from the camera mechanism, such that the heat generating film is sandwiched between the transmitting member and the water repelling film.

8. The camera device of claim 1, wherein the substrate transmits light.

9. The camera device of claim 1, wherein the water repelling film, the heat generating film, and the substrate are disposed over an imaging range such that the camera images the obverse side of the transmitting member via the water repelling film, the heat generating film, and the substrate.

* * * * *